United States Patent [19]

Ruder

[11] 4,107,794
[45] Aug. 15, 1978

[54] MIXING BED PICK UP APPARATUS FOR A STAPLE SUPPLY PILE

[75] Inventor: Joachim Ruder, Duisburg, Germany

[73] Assignee: DeMag Aktiengesellschaft, Duisburg, Germany

[21] Appl. No.: 797,131

[22] Filed: May 16, 1977

[30] Foreign Application Priority Data

May 18, 1976 [DE] Fed. Rep. of Germany ....... 2622115

[51] Int. Cl.² ............................................. B01F 15/02
[52] U.S. Cl. ................................... 366/346; 198/509; 198/701
[58] Field of Search ....................... 259/1 R, 2, 5, 6, 7, 259/8, 9, 10, 21, 22, 25, 26, 36, 37, 40, 41, 42, 45, 46; 198/701, 509; 366/345, 346

[56] References Cited

U.S. PATENT DOCUMENTS

| 2,401,913 | 6/1946 | Dawson | 259/47 |
| 3,078,076 | 2/1963 | Ferguson | 259/180 |
| 3,570,817 | 3/1971 | Claussen | 259/46 |

FOREIGN PATENT DOCUMENTS 896,662  5/1962  United Kingdom ...................... 259/40

Primary Examiner—Robert W. Jenkins
Attorney, Agent, or Firm—Mandeville and Schweitzer

[57] ABSTRACT

The present invention involves a mixing bed pile apparatus with a bladed pipe pick-up, or similar means, to break down peaked piles of staple materials. The arrangement is of a kind where blades are distributed, spiral-like, over the pick-up pipe or tube circumference. The blades charge a removal belt for the mixed picked up material arranged parallel with the longitudinal axis of the pick-up, which belt is reversible.

1 Claim, 9 Drawing Figures

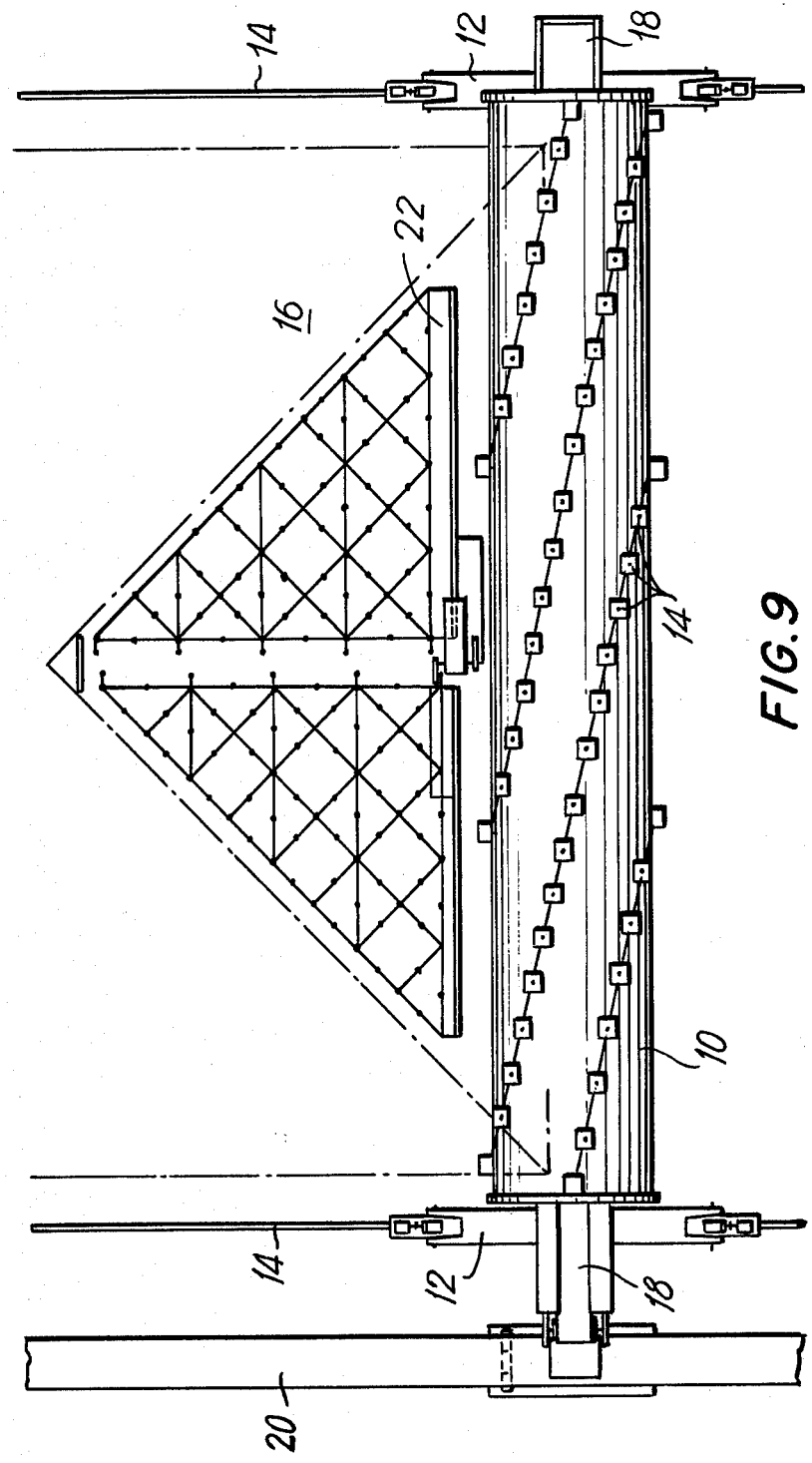

MIXING BED PICK UP APPARATUS FOR A STAPLE SUPPLY PILE

BACKGROUND AND STATEMENT OF THE INVENTION

Industrial plants working with bulk materials require uniform quality of the materials supplied in the interest of continuous and optimum operation. This task is simplified by keeping the differences in the composition of basic materials as small as possible. The raw materials supplied are not merely used in the states in which they are supplied, but rather are subjected to a previous process of blending and unifying. Suitably, this equalization is done in connection with bunkering for storage.

Piles of staple materials are known to be a very favorable method of bunkering for ores with respect to investment costs. It is also successfully used for anthracite, lignite, and other bulk materials when dealing with large quantities of material. In order to utilize a staple pile while at the same time insuring constant quality of the raw materials thus stacked, the staples must be accumulated in a certain fashion, and especially, withdrawn or broken down in a certain fashion.

The basic idea is to distribute the flow of material supplied by a conveyor installation over the entire length of the pile in such a manner that any pile cross section contains a small quantity representative of all types of material used to build up the pile. If a thin slice extending over the cross section of the pile is taken, the contents of such slice would be made up of a mixture of small quantities of all types of material supplied, and it represents an average quality of the materials used to form the pile.

The magazine LIGNITE, Issue 2, Feb. 1966, pages 47 to 51, discusses a blade pick-up pipe or tube consisting of one pipe whose outer circumference is fitted with offset blades, and of a two-piece raking device covering the frontal slope of the pile to feed the pipe. The bladed pipe extends the entire breadth of the foot of the pile, and revolves at a constant speed. The bipartite rake moves back and forth in countermovement. The material mixture thus collecting at the foot of the pile is picked up by the blades of the bladed pipe or tube, and is brought to a conveyor belt arranged in the interior of the bladed pipe.

It is the object of the present invention to improve upon the known apparatus, particularly to achieve a more complete and consistant charging of the removal belt combined with an increase in the mixing effect when receiving the goods, whereby the construction and function of the apparatus remains as simple as possible. To solve this problem, the invention includes four pick-up spirals of blades distributed evenly over the circumference of the pick-up pipe, with each spiral having two blades arranged parallel with the front of the pile, and each with an embracing angle of 270°. Also, the velocity ratio between removal belt velocity and the rate of advance of the delivery points of the blades on the spirals is 0.6. In a mixing bed pile apparatus with pipe blade pick-up where such conditions are maintained, maximum results are obtained with respect to charging of the belt and the mixing ratio.

The pile mixing bed apparatus of the invention has, furthermore, an advantage over known apparatus in that the number of blades has been reduced considerably, thus facilitating a more shallow incline of the blade helix around the pipe. The reduction in the blade number entails considerable advantages when reversing operation, because a reduced number of blades has to be tilted or adjusted, which results in a time saving. The invention, therefore, represents a simplification coupled with greater economy, and the simultaneous ideal charging of the removal belt in connection with better mixing effect on account of the ratio between pipe revolution, spiral incline and belt velocity.

The following description illustrates an example of the arrangement and performance of a bladed pipe pick-up with the pipe or tube separated into 24 sections of even length, each of which corresponds to the length of a blade. Each section is complete with four blades evenly distributed over the circumference, such blades being regularly offset from section to section in such a manner that they form four cascade spirals according to the invention, with an embracing angle of 270°. To illustrate the charging of the belt, the belt has been divided into sections of even length, which are in integral relation to the blade length and/or bladed pipe section length. The following illustrated example is based on a belt section length of one fifth of the blade length.

DESCRIPTION OF THE DRAWINGS

FIG. 9 is a top plan view of the device shown in FIG. 8.

DETAILED DESCRIPTION OF THE INVENTION

Figure 1:
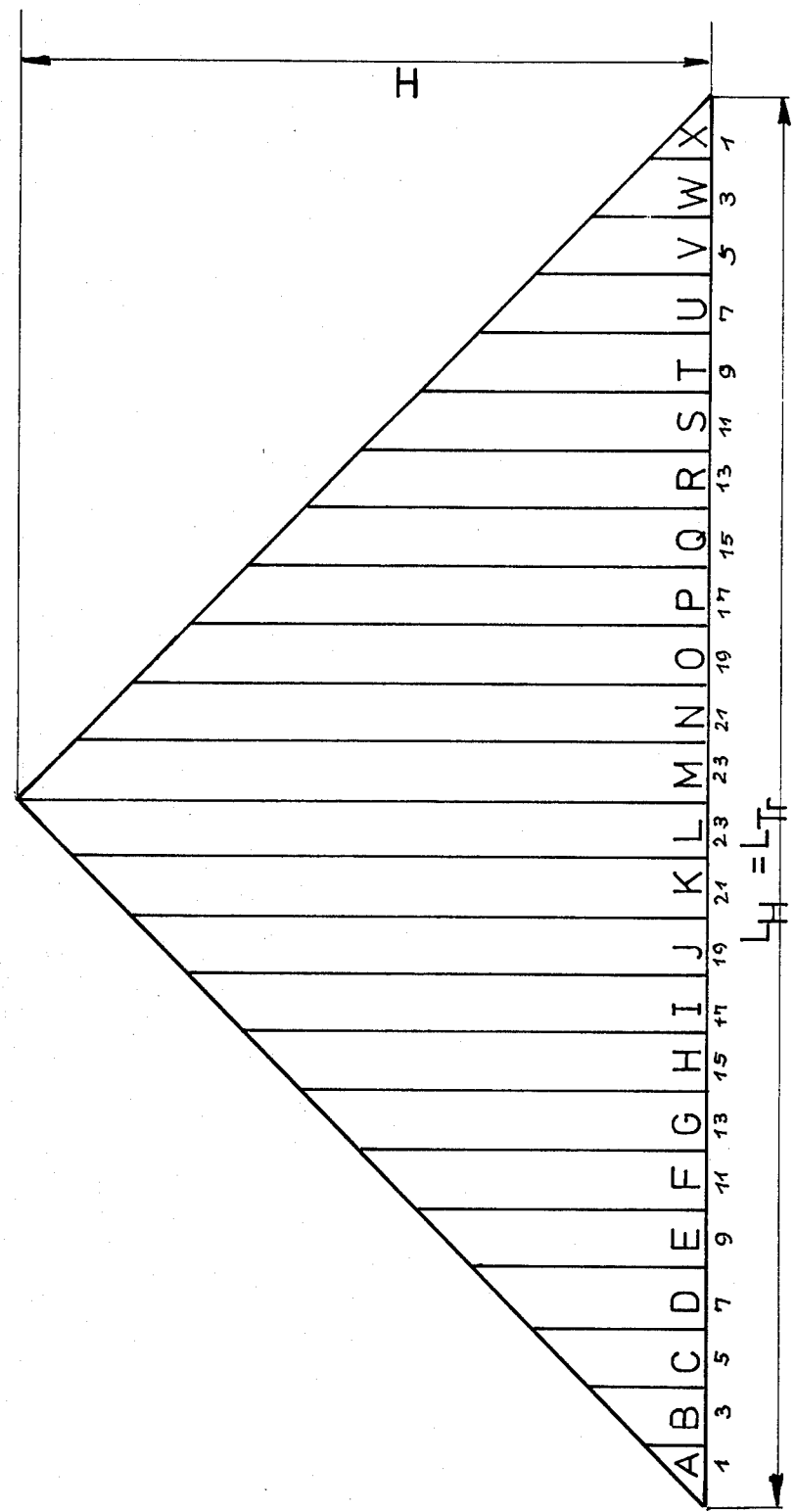
FIG. 1 is a cross section of a peaked pile of stored materials to be picked up and schematically illustrated to be divided into 24 sections of equal width.

For the purposes of the illustrated example, it is assumed that the pile shown on FIG. 1 was, according to plan, piled up in 36 layers running the length of the pile in chevron pattern. It is composed of three types of bulk material in a mixed ratio of type 1 = 25%; type 2 = 65%; and type 3 = 10%. Analogous with the division of the bladed pipe the breadth at the foot of the pile is divided into 24 uniform sections, which are marked A through X in FIG. 1. To each section of the bladed pipe is assigned the respective section — or the respective field — of the pile cross section. $L_H$ stands for the pile breadth at the foot, and equals pipe length $L_T$. Pile height is marked by H.

Figure 2:
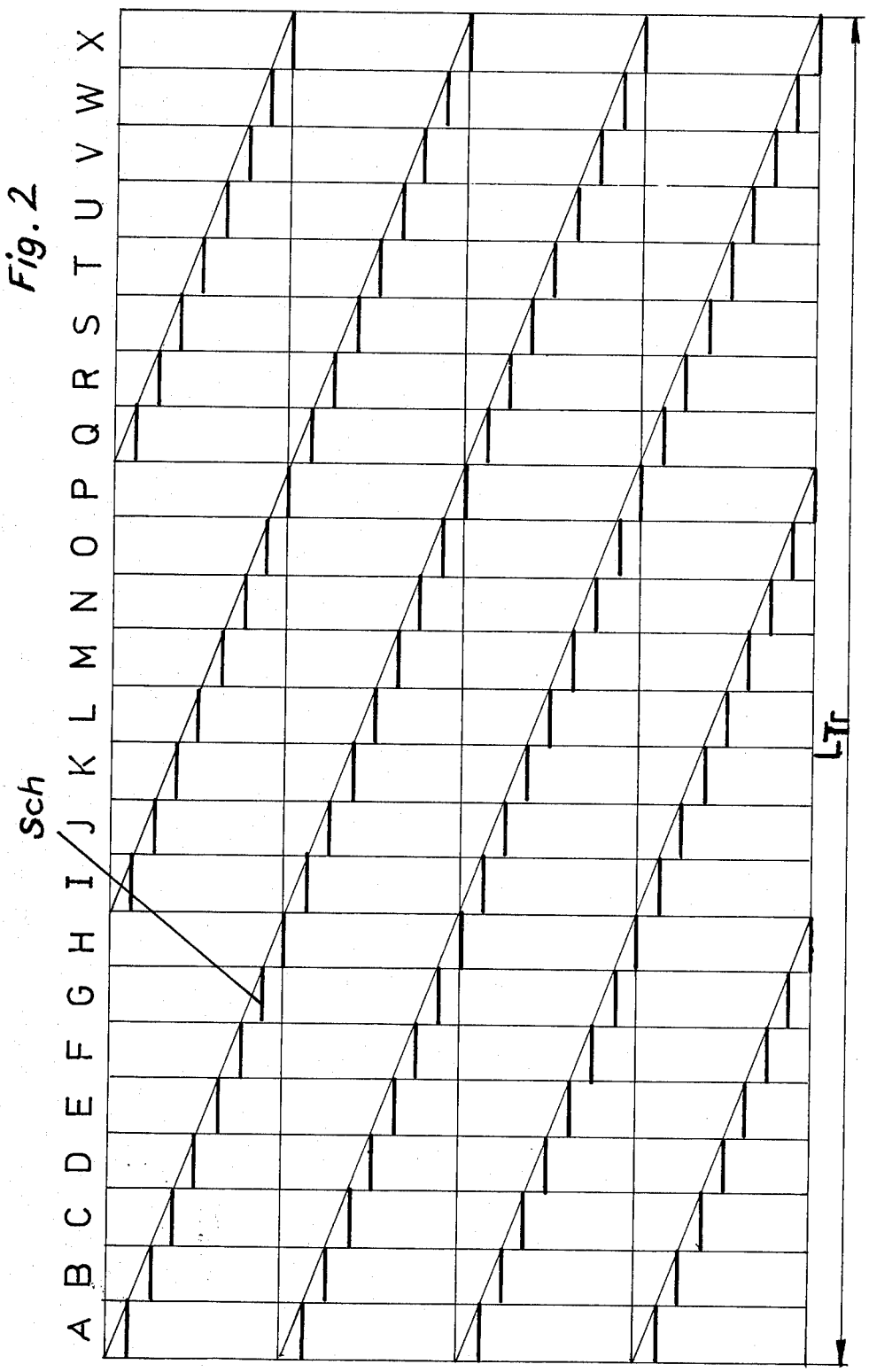
FIG. 2 is a schematic illustration of the rotating tube pickup device showing the arrangement of blades thereon according to the invention.

If pile sections A and/or X are viewed as single volumes, the number of volume units apportioned to the individual sections results from the geometric relation between $L_H$ and H. Numbers 1 through 23 in FIG. 1 represent the number of volume units in the individual sections. FIG. 2 shows the shell of the bladed pipe, and indicates the arrangement of the individual blades Sch. The blade pipe sections corresponding to pile sections A through X are marked A through X also in FIG. 2.

Figure 3:
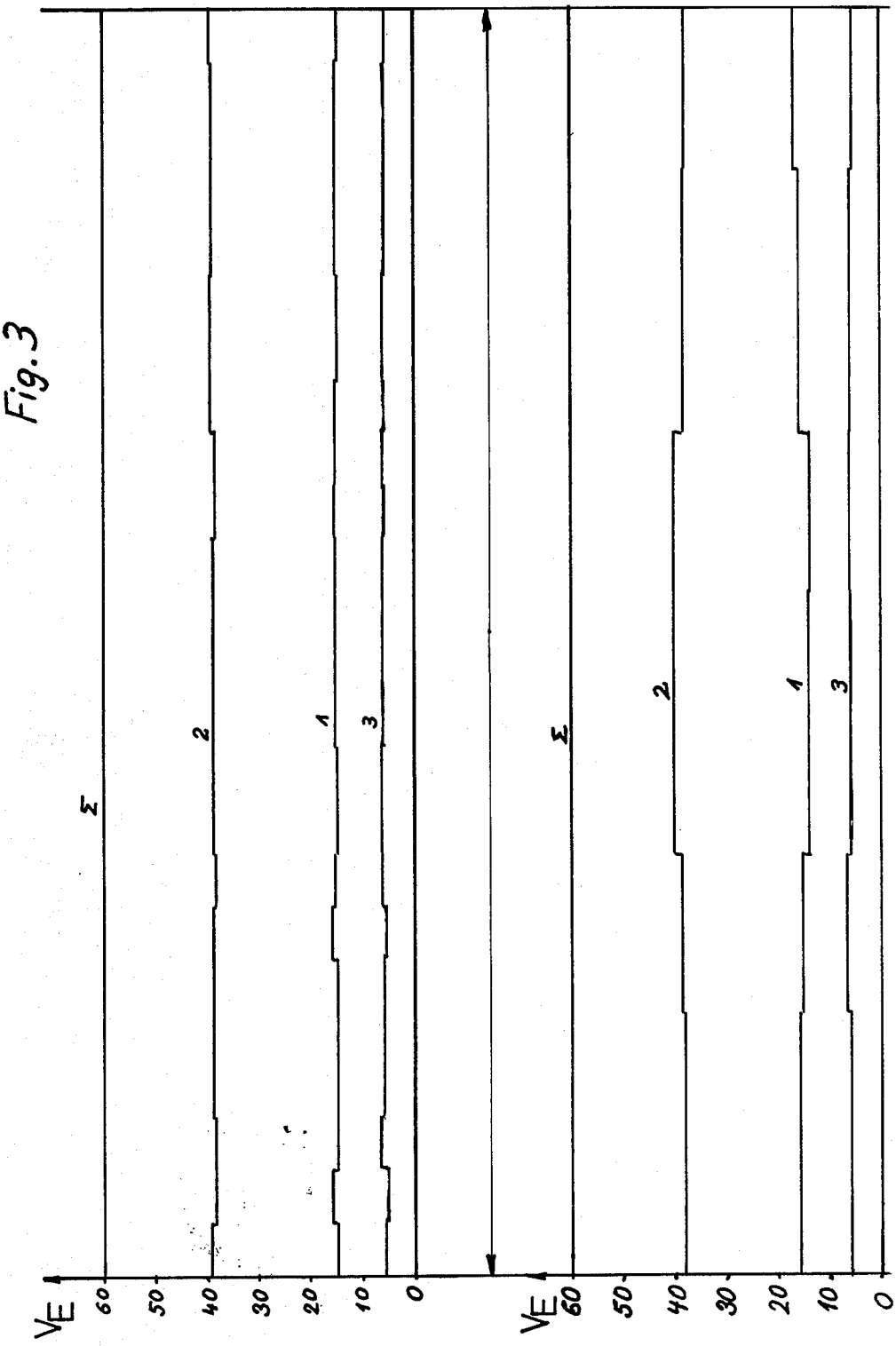
FIG. 3 is a schematic illustration of the volume of charge to the delivery belt by each of the four spiral blade arrangements as measured in one representative section of the delivery belt.

FIG. 3 shows the volume of belt charge for one mixing period for the entire volume as well as for the individual types contained in the mixture. The upper portion shows the charge during parallel operation, i.e. same direction of belt movement and bladed pipe delivery. The lower portion of FIG. 3 indicates conditions during opposed operation, i.e. opposite directions of belt movement and bladed pipe delivery. FIG. 3 shows that execution in accordance with the idea of the invention keeps the entire belt charge constant, and that the proportion of the individual types of the mixture deviate only very little from the theoretical value.

Figure 4:
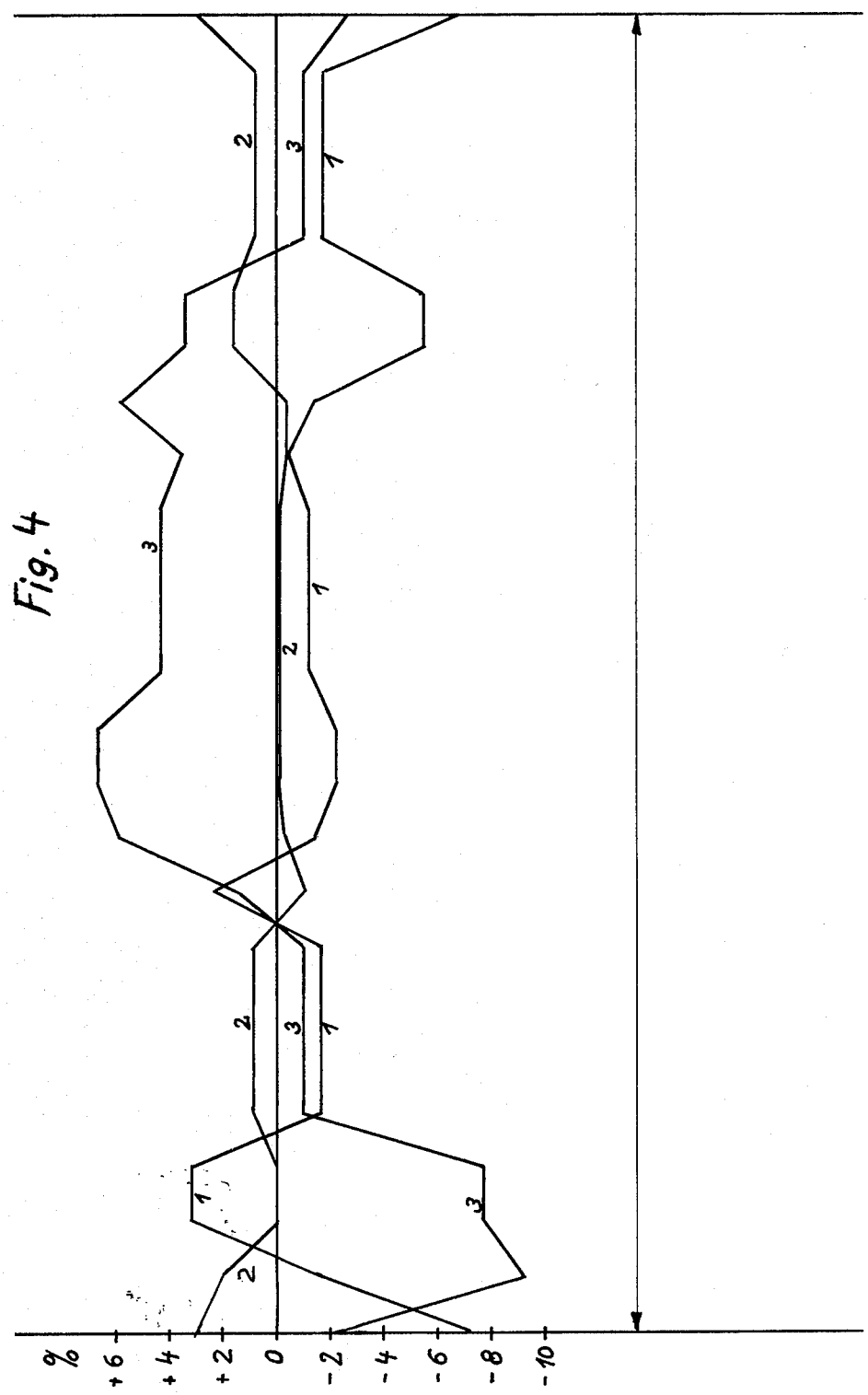
FIG. 4 is a graphic illustration of the percentage deviation from nominal mixing ratio according to the invention for one period of operation, with the blade movement and delivery belt movement in the same direction.
Figure 5:
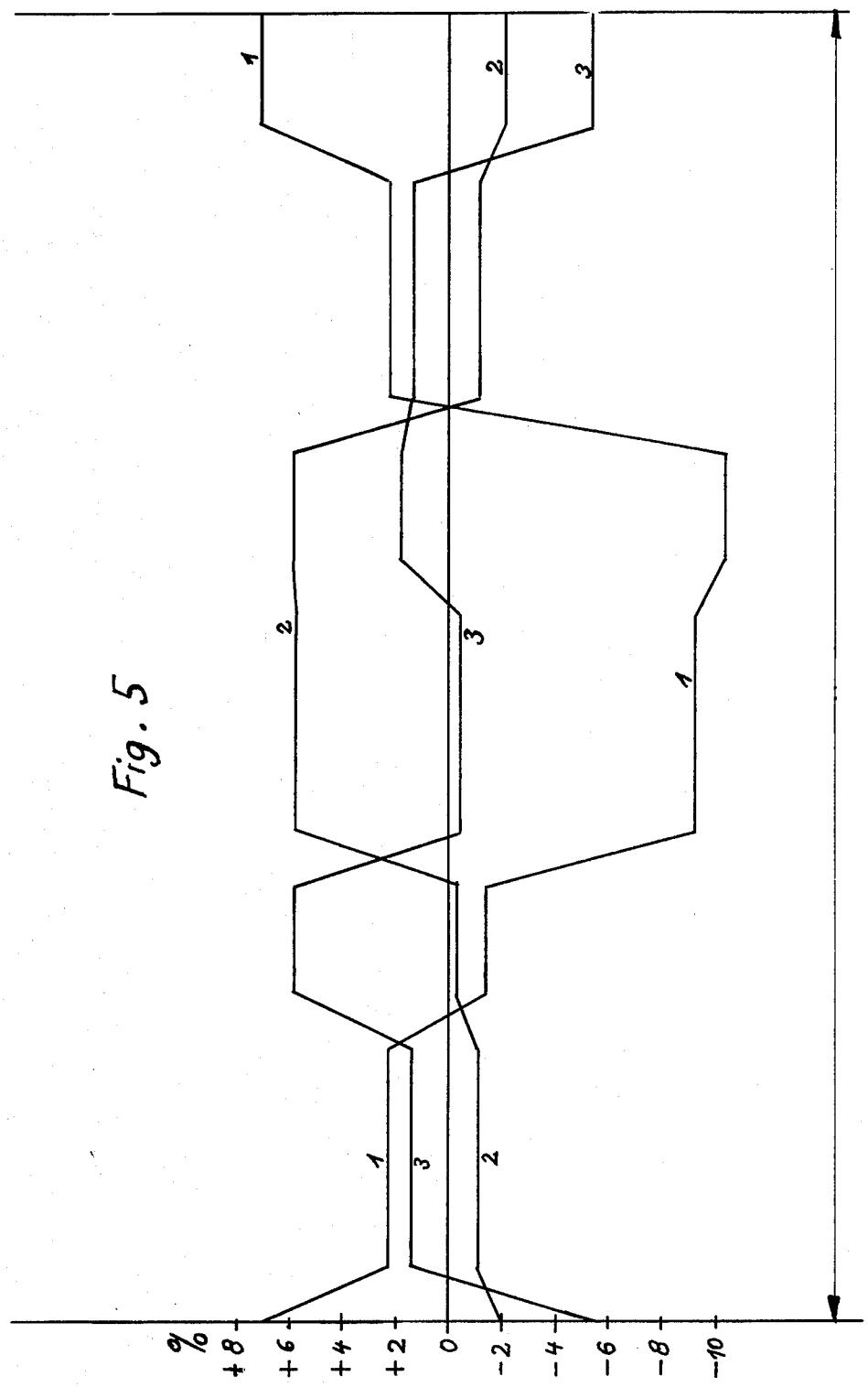
FIG. 5 is a graphic illustration similar to FIG. 4, but with the blade movement and belt movement in opposite directions.
Figure 6:
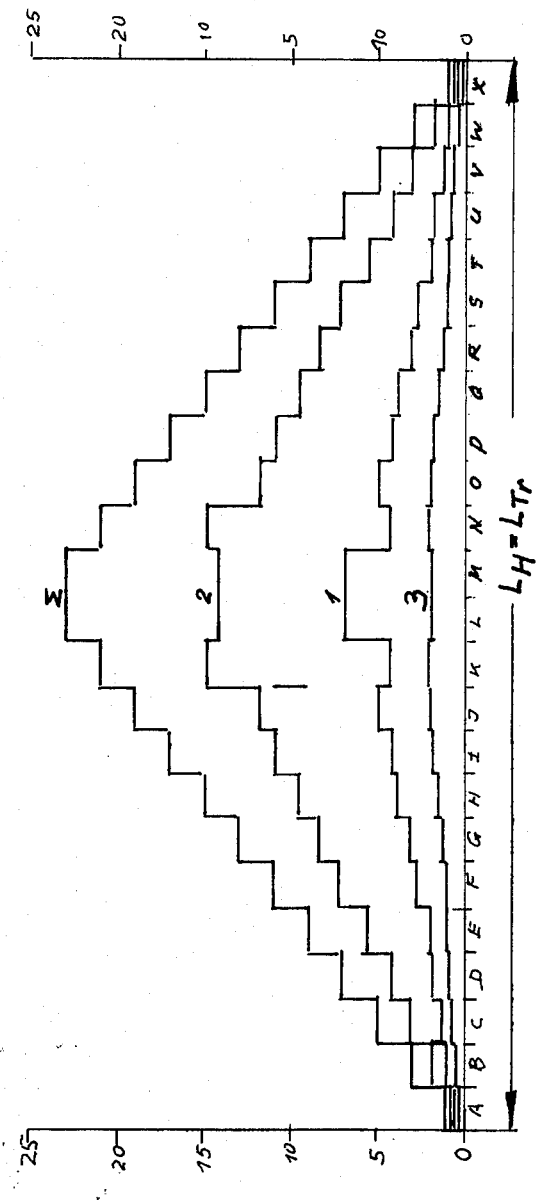
FIG. 6 is a graphic illustration of the volume makeup of the charge material to the belt in relation to the storage pile cross section.

The percentage deviation of the individual materials forming the pile mixture from the theoretical value within one period is shown in FIG. 4 for parallel operation, and in FIG. 5 for opposed operation. FIG. 6 shows the volume make-up of the pile cross section through the individual sections A to X for the entire volume, as well as with respect to the mixture for the pile volume generally.

Figure 7:
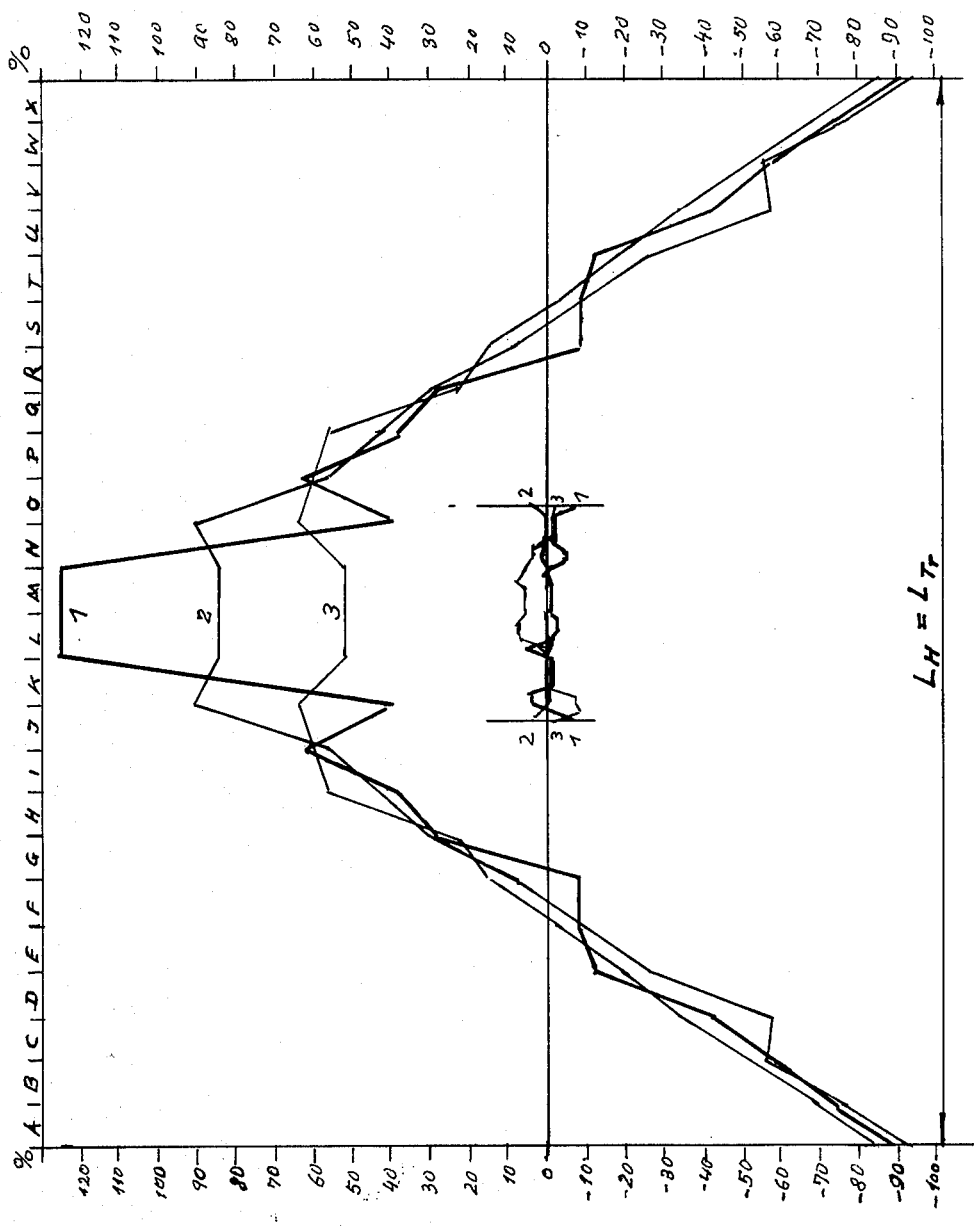
FIG. 7 is a graphic illustration of the percentage deviation of mixing ratio from the mean value of the storage pile.

Based on the above, the course of percentage deviation shown in FIG. 7 of the individual types from their mean value in the entire pile has been deduced over pile section A to X. To illustrate the equalization of the mixture due to the ideas of the invention, the deviation of the mixture on the belt as shown in FIG. 4 has been transposed onto FIG. 7 true to scale.

Figure 8:
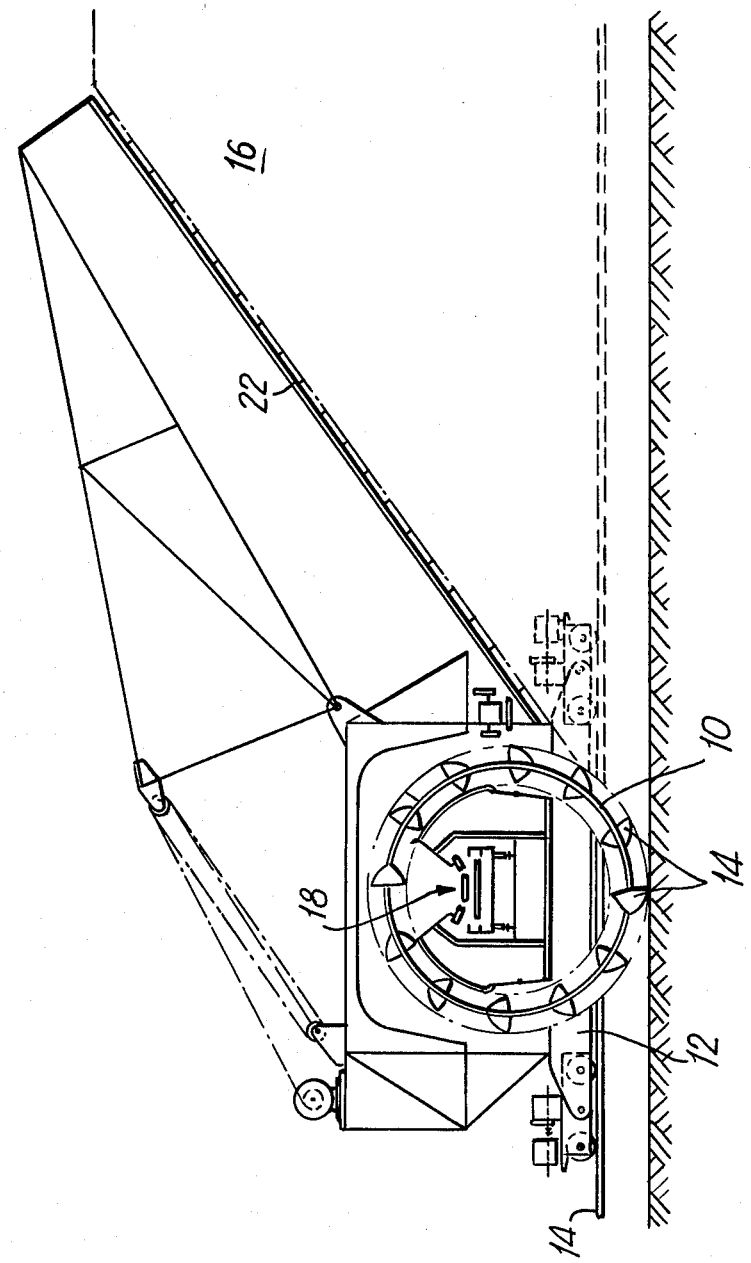
FIG. 8 is a somewhat schematic end elevational view of a conventional rotary tube pick-up device useful in the application of the invention.

A conventional pick-up tube is shown schematically in FIGS. 8 and 9, in which the horizontal tube 10 is mounted for rotation in trucks 12 at each end. Trucks 12 in turn are mounted for reciprocation on rails 14. The length of tube 10 is such as to allow blades 14 to sweep across an entire pile 16. Tube 10 is rotated at a constant speed by a drive (not shown).

Blades 14 are arranged on tube 10 surface, so as to pick up materials at the bottom of pile 16 and deposit them on a conveyor belt 18 mounted internally of rotating tube 16. Conveyor belt 18 in turn, delivers the material to the side of tube 10 onto conveyor belt 20, as shown in FIG. 9. A harrow 22 completes the equipment and is required to take the materials off of pile 16.

I claim:

1. Apparatus for picking up and delivering incrementally and continuously representative portions of a pile of staple supply materials, comprising
   (a) a rotary pipe pickup device positioned adjacent the base of a supply pile;
   (b) a plurality of pickup blades positioned on said pipe, said blades positioned in spiral patterns around the circumference of said pipe;
   (c) a reversible supply belt positioned adjacent said pipe, and mounted to move in the same direction as the spiral pattern on said pipe, or opposite thereto; the improvement characterized by
   (d) said plurality of blades spaced evenly from each other on said pipe in said spiral pattern;
   (e) said plurality of blades arranged in four longitudinally extending spirals of 24 blades each;
   (f) each said blade positioned on said pipe with respect to the front of a supply pile being delivered at an embracing angle of 270°; and
   (g) the ratio of velocity between said supply belt movement and the rate of advance of the delivery points of said plurality of blades is 0.6.

* * * * *